3,241,891
SHAFT BEARING MOUNTING
Glenn S. Farison, Southfield, Mich., assignor to Chrysler Corporation, Highland Park, Mich., a corporation of Delaware
Original application May 2, 1960, Ser. No. 26,300, now Patent No. 3,184,625, dated May 18, 1965. Divided and this application Dec. 30, 1964, Ser. No. 422,228
5 Claims. (Cl. 308—15)

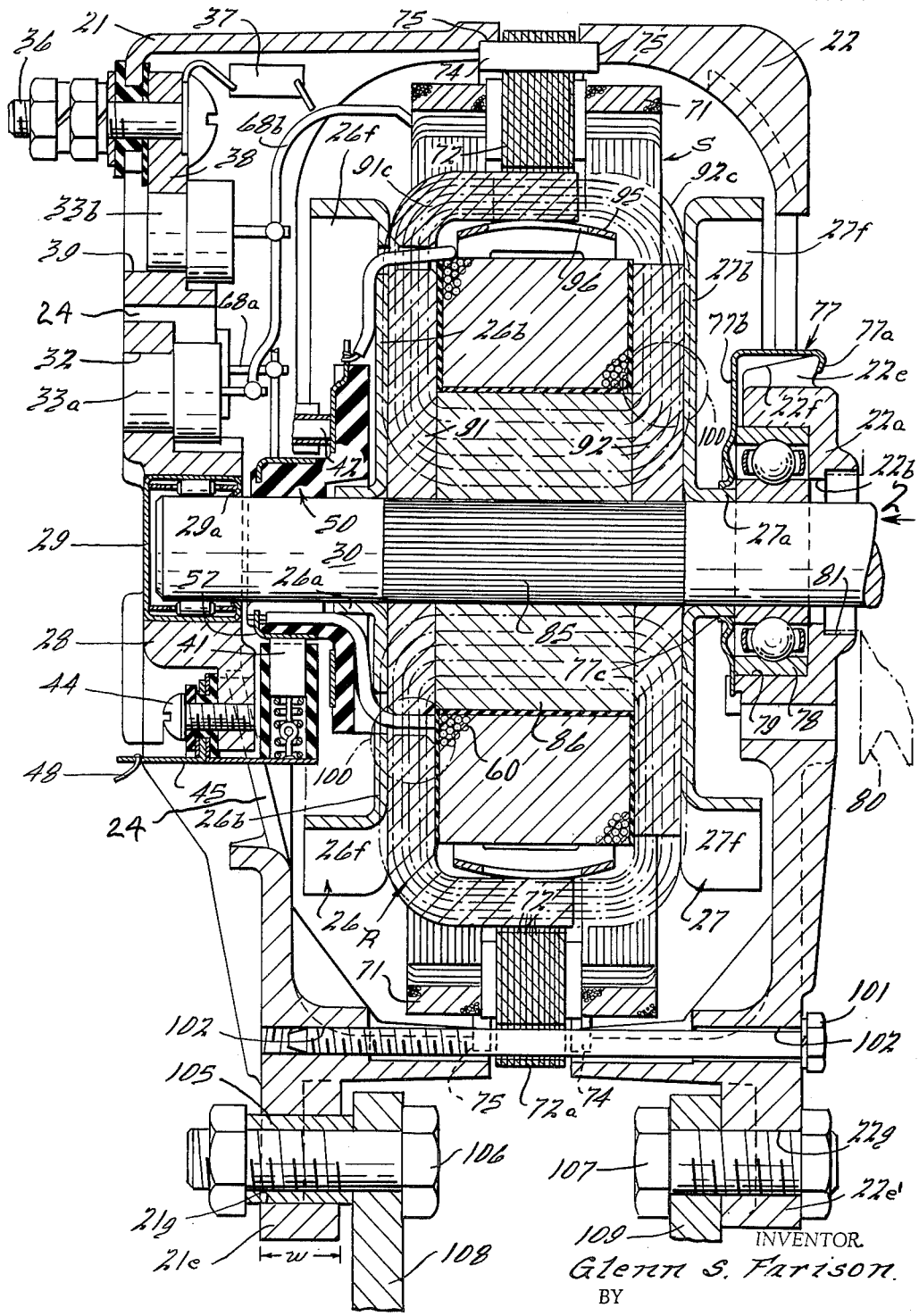

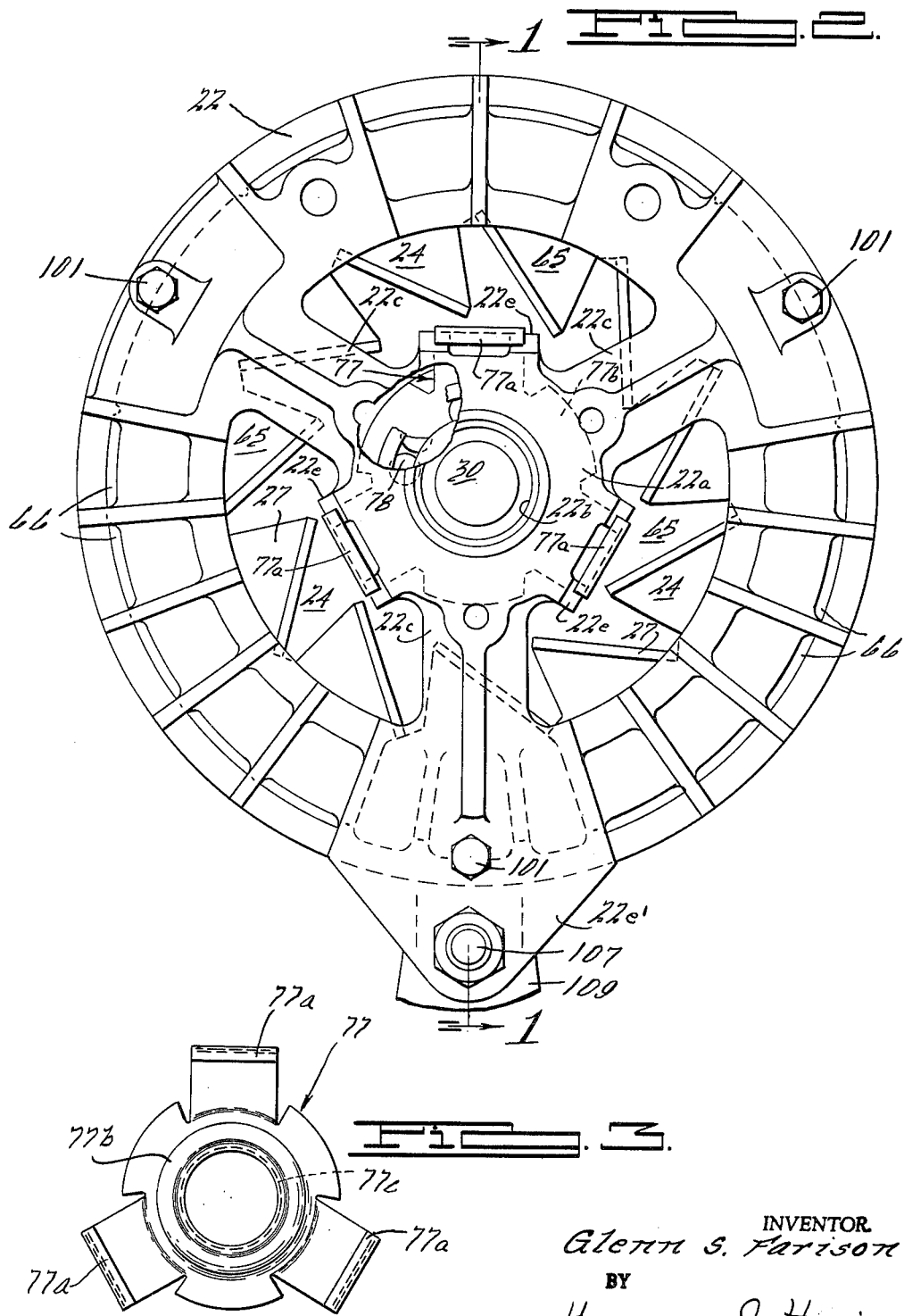

This invention relates to rotary shaft bearing structures and particularly to an improved bearing construction for the rotor shaft of an inductor-type alternator-rectifier unit. This application is a division of copending United States Patent application Serial No. 26,300, filed May 2, 1960, in the name of Glenn S. Farison, now U.S. Patent 3,184,625.

It is a prime object of this invention to provide a new improved, simplified form of sealed bearing structure for the rotor shaft of an alternator unit or similar type shaft bearing mounting.

It is another object of this invention to provide a snap-on bearing clamp that serves a dual function of sealing the bearing against foreign matter and also anchoring the bearing in a recessed support.

Other objects and advantages of this invention will become readily apparent from a reading of the following description and a consideration of the related drawings, wherein:

FIGURE 1 is a sectional elevational view taken along the line 1—1 of FIGURE 2, showing an alternator-rectifier unit embodying this invention;

FIGURE 2 is an end elevational view, partially broken away, looking in the direction of the arrow 2 on FIGURE 1, at the right end of the alternator-rectifier unit shown in FIGURE 1 with portions of the housing right side broken away for the sake of clarity; and FIGURE 3 is a side elevational view of the bearing clamp shown in FIGURES 1 and 2.

Looking particularly at FIGURES 1 and 2 of the drawings, it will be seen that this alternator-rectifier unit comprises a pair of slotted housing or shield assemblies 21 and 22 that are axially spaced apart by a stator unit S. Housing piece 21, that is shown at the front or left side of FIGURE 1 is denoted the rectifier end of the housing. It includes a plurality of interiorly arranged air circulating slots 24. These slots 24 cooperate with fan 26 fixed to the rotor unit R to provide for the circulation of cooling air through the alternator-rectifier unit during operation thereof. Housing rectifier piece 21 is formed with a rotor shaft bearing seat 28 at its center portion that receives a cup contained roller bearing assembly 29. Roller bearing assembly 29 is preferably mounted in the housing seat 28 by means of a press fit. It will be noted that the edge portion 29a of the bearing cup 29 is turned over to abut and seal against the rotor shaft 30 so as to protect the bearing 29 against damage from the introduction of foreign matter thereto. Bearing 29 is initially packed with lubricant and is intended to be permanently lubricated.

The driven end housing piece 22 embodying this invention (see FIGS. 1 and 2) is generally similar in design to the rectifier end housing piece 21 in that it is slotted at 65 throughout its central or hub area and is slotted at 66 throughout its peripheral area to provide for maximum cooling air flow through the alternator unit by the centrifugal fan 27. The fans 26, 27 suck cooling air into the alternator unit through the hub portion openings 24 and 65 and pass the cooling air across the alternator internal structure and then discharge it through the peripheral housing slots 66.

As can be clearly seen from FIGURES 1 and 2, the end piece 22 is formed with a circular hub portion 22a that is pierced by a bore 22b to receive the drive end of the rotor shaft 30. Extending radially outwardly from the hub portion 22a are three equally spaced struts 22c. Located between the struts 22c on the outer periphery of the hub portion 22a are three bearing clamp seats 22e. The seats 22e are tapered as shown at 22f in FIGURE 1 to facilitate the snap-on mounting of the plate-like bearing clamp 77. Clamp-type cover plate 77 has three radially extending arms with flanged, outer, hook-like, edge portions 77a that are slidably forced up the tapered seats 22f to snap over the outer ends of the seats 22e. The clamp-type cover plate 77 has a circular hub portion 77b that is adapted to bear against and hold the pre-lubricated ball bearing assembly 78 in the recessed seat 79 in end piece hub portion 22a. In addition to providing a portion 77b to hold the bearing assembly 78 in the recess 79, the clamp-type cover plate 77 has an axially extending flange portion 77c formed at its inner periphery adjacent the bore therein that receives the rotor shaft 30. The clamp flange 77c (see FIGURE 1) is adapted to provide a seal against the shaft 30, or the fan 27 thereon, so that foreign matter that might be injurious to the bearing assembly 78 will not enter the bearing from the inner side thereof. The outer side of the bearing assembly 78 is sealed by the hub of the pulley drive wheel 80 (shown in broken lines in FIGURE 1) that seats in the recess 81 in the housing end piece hub portion 22a. It is thought to be obvious from the foregoing description that the bearing assembly anchor clamp-type cover plate 77 serves a dual function in that in addition to locking the bearing assembly 78 in its housing seat 79, it also seals the inner face of the bearing 78 against the entrance of any harmful foreign matter therein. Because of this novel clamp and seal construction 77 it is not necessary to use an expensive pre-sealed bearing assembly unit for rotatably mounting the drive end of the rotor shaft 30.

I claim:
1. In a rotary shaft mounting, a support member having a bore therethrough to receive and journal a shaft and circumferentially spaced seat portions formed thereon, a bearing assembly mounted in said bore and rotatably supporting said shaft, a cover plate capping at least one end of said support member bore, said cover plate having an aperture therein matingly receiving and sealingly engaging said shaft and means on said cover plate anchoring it to said support member, said last mentioned means comprising circumferentially spaced, resilient arms engaged by a snap-on connection with said seat portions formed on said support member.

2. In a rotary shaft mounting, a support member having a bore therethrough to receive and journal a shaft and circumferentially spaced seat portions formed thereon, a bearing assembly mounted in said bore and rotatably supporting said shaft, a cover plate capping at least one end of said support member bore, said cover plate having an aperture therein matingly receiving and sealingly engaging said shaft and means on said cover plate anchoring it to said support member, said last mentioned means comprising radially extending, circumferentially spaced, resilient arms engaged by a snap-on connection with said seat portions formed on said support member, said seat portions including tapered portions engaged by said arms faciliting snap-on connection of said cover plate to said support member.

3. In a rotary shaft mounting, a support member having a bore therethrough to receive and journal a shaft and circumferentially spaced seat portions formed thereon, a bearing assembly mounted in said bore and rotatably supporting said shaft, a cover plate capping at least one end of said support member bore, said cover plate comprising a central hub portion having an aperture therethrough matingly receiving and sealingly engaging the shaft, said central hub portion of said cover plate covering the adjacent end of said bearing assembly and having radially outwardly extending, circumferentially spaced arms formed with axially extending hook-like connector means anchored to said seat portions on said support member by snap-on connections.

4. In a rotary shaft mounting, a support member having a bore therethrough to receive and journal a shaft and circumferentially spaced seat portions formed thereon, a bearing assembly mounted in said bore and rotatably supporting said shaft, a cover plate capping at least one end of said support member bore, said cover plate comprising a central hub portion having an aperture therethrough matingly receiving and sealingly engaging the shaft, said central hub portion of said cover plate covering the adjacent end of said bearing assembly and having radially outwardly extending, circumferentially spaced arms formed with axially extending hook-like connector means anchored to said seat portions on said support member by snap-on connections, said support member seat portions including tapered portions to facilitate snap-on connections of the hook-like means on the cover plate to the support member.

5. In a shaft mounting as set forth in claim 3 wherein said cover plate has a substantially axially extending flange surrounding the aperture in its central hub portion that portion that sealingly contacts said shaft.

References Cited by the Examiner

UNITED STATES PATENTS

| 1,697,050 | 1/1929 | Delaval-Crow | 308—189 |
| 1,924,937 | 8/1933 | Leister | 308—189 |
| 2,003,000 | 5/1935 | Kelpe | 308—187.1 |
| 2,210,543 | 8/1940 | Cox | 308—187.1 |
| 3,121,179 | 2/1964 | Macks | 308—9 |

FOREIGN PATENTS

| 1,235,238 | 9/1958 | France. |
| 840,635 | 6/1952 | Germany. |

DON A. WAITE, *Primary Examiner.*
ROBERT C. RIORDON, *Examiner.*